UNITED STATES PATENT OFFICE.

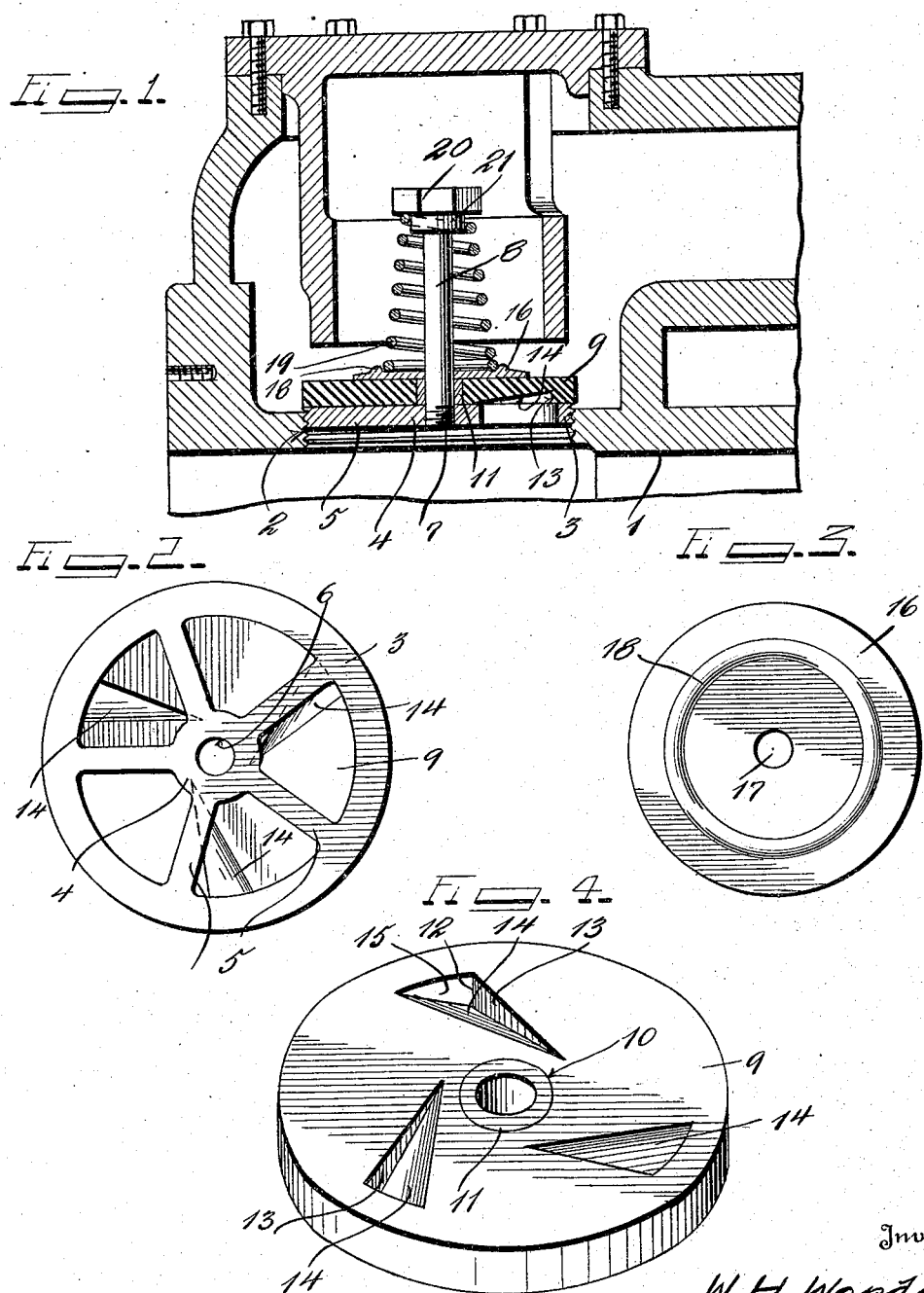

WILLIAM H. WORDEN, OF CADILLAC, MICHIGAN, ASSIGNOR OF ONE-HALF TO C. E. CURTISS, OF GRAND RAPIDS, MICHIGAN.

PUMP-VALVE.

1,188,524.  Specification of Letters Patent.  Patented June 27, 1916.

Application filed May 21, 1915. Serial No. 29,603.

*To all whom it may concern:*

Be it known that I, WILLIAM H. WORDEN, citizen of the United States, residing at Cadillac, in the county of Wexford and State of Michigan, have invented certain new and useful Improvements in Pump-Valves, of which the following is a specification, reference being had therein to the accompanying drawing.

This invention relates to pump valves and has for its principal object the production of a valve for water pumps, which is provided with simple and efficient means for preventing the valve from being seated more than once upon one particular portion, thereby causing the wear upon the valve to be evenly distributed, so as to prevent the water from running back through the valve into the well.

Another object of this invention is the production of a pump valve having a valve member, which is provided with a plurality of sockets, which are so constructed as to receive a quantity of the water passing through the valve for the purpose of rotating the valve member, and thus causing the same to be seated upon different portions as the same moves to a closed position, and thus prevent undue wear upon any particular portion of the valve seat and valve member, whereby a tight closure is provided for preventing the water from repassing through the valve member when the same is in a closed position.

With these and other objects in view this invention consists of certain novel combinations, constructions and arrangements of parts as will be hereinafter fully described and claimed.

In the accompanying drawing:—Figure 1 is a vertical section through the valve, as constructed in accordance with this invention, showing the same in an assembled position. Fig. 2 is a bottom plan view of the pump valve. Fig. 3 is a top plan view of the washer. Fig. 4 is a detailed perspective view of the valve member, showing the same in an inverted position.

Referring to the accompanying drawing by numerals it will be seen that this pump valve is adapted to be used in combination with any suitable pump, as shown herein at 1. This pump is provided with an internally threaded opening 2 and into engagement therewith is threaded the valve seat 3. This valve seat is constructed so as to provide a central body 4 carried by the spiders 5 upon the outer portions 3 of the seat. This body 4 is provided with a central aperture 6 for the purpose of carrying the threaded end 7 of the bolt 8. This bolt is threaded into engagement with the seat so as to provide a rigid construction upon which the valve member and other elements are adapted to be supported.

The valve member 9, which is formed preferably of composition rubber or of like material, is solid so as to fit snugly upon the upper portions of the valve seat 3. The central portion of this valve member 9 is provided with an opening 10, in which there is fixedly carried a hollow bushing 11. This bushing 11 may be formed of any suitable metal, so as to bear upon the bolt 8, and thus prevent wear upon the valve member 9, caused by the reciprocation and rotation of the valve member upon the bolt. By carefully referring to Figs. 1 and 4, it will be noted that the valve member 9 is provided with a plurality of sockets 12. Each socket has a vertical side wall 13 and with a slanting wall 14. The slanting wall 14 extends from the outer surface of the valve member 9 to the inner portions of the vertical wall 13, as clearly shown in Fig. 1. These sockets extend from a vertical end wall 15 and taper throughout their entire length toward their inner ends. When this valve member is positioned, as shown in Fig. 1, the passage of the water through the valve seat will lift the valve member 9 from engagement therewith, and at the same time a portion of the water will be directed by the slanting walls 14 against the straight walls 13 and 15, thereby rotating the valve member 9 a portion of a revolution, and thus when the valve member is reseated upon the valve seat 3, it will not be seated upon an old portion. In this manner, the wear upon the valve member 9 will be evenly distributed upon all of the portions of the valve member, and thus uneven portions which might be caused by the reseating of the valve continually in the same position are eliminated, and thus any possibility of the repassing of the water through the valve and back into the well is eliminated.

The metallic washer 16 is provided with an opening 17 so as to allow the washer to be positioned upon the bolt 8, as shown in Fig. 1, and rest upon the upper portions of the valve member 9. This washer is provided with an integral annular rib 18, within which fits the coil spring 19. The upper end of this coil spring 19 bears against the head 20 of the bolt 8 and embraces the neck 21.

When this device is in operation, it will normally assume the position shown in Fig. 1. The valve member 9 is yieldably retained upon the valve seat 3 by means of the coil spring. The water passing through the valve seat will move the valve member upwardly, compressing the coil spring 19. As soon, however, as the pressure of the water is discontinued, the coil spring will force the valve member into engagement with the valve seat. It will be noted, however, that since the coil spring bears upon the metallic washer 16, the wear upon the valve member will be greatly reduced, since the broad bearing surface of the washer will engage the valve member. Upon each lifting of the valve member the water passing therethrough will move or rotate the valve member, and thus present a new seating surface upon each engagement thereof with the valve seat.

From the foregoing description it will be seen that a simple and efficient pump valve has been produced, wherein means is provided for rotating the valve member, and thus prevent the wear thereof upon any particular portion. It should, of course, be understood that any number of sockets may be employed, according to the rapidity with which it is desired to rotate the valve member or according to the force of the water which is passing through the valve. It is, therefore, not intended to limit the construction of this device in accordance with the specific means herein disclosed, but it is intended to include all such inventions as properly come within the scope of the device as claimed.

What is claimed is:—

1. In a pump valve of the class described, the combination of a valve seat having inwardly extending spiders, a body carried by said spiders, a vertical bolt carried by said body, a valve member positioned upon said seat, said valve member being reciprocally mounted upon said bolt, means for yieldably holding said valve member upon said seat, said valve member having a flat lower face so as to fit evenly upon said seat, said valve member having a plurality of sockets formed in its lower surface, each socket having a vertical wall and also a slanting wall, said slanting wall extending from the surface of said valve member to the inner portion of said vertical wall, whereby when water passes through said valve it will be deflected by said slanting walls against said vertical walls, whereby as the water lifts said valve member from said seat said valve member will be rotated.

2. In a pump valve, the combination of a seat, a disk-like valve member positioned upon said seat, means for holding said valve member in a central position above said seat, said valve member having a plurality of sockets formed therein, each socket having a vertical wall extending inwardly from a point adjacent the periphery of said valve member, a slanting wall extending from the surface of said valve member to the inner portion of said vertical wall, a substantially straight wall extending from said slanting wall to said vertical walls at their outer ends, said slanting walls being adapted to direct water passing through said valve whereby the water will be deflected by said slanting walls against said vertical and straight walls, whereby said valve member will be rotated as it is lifted from said valve seat.

In testimony whereof I hereunto affix my signature.

WILLIAM H. WORDEN.